This invention relates to a control mechanism and more particularly to such mechanism for a planetary transmission.

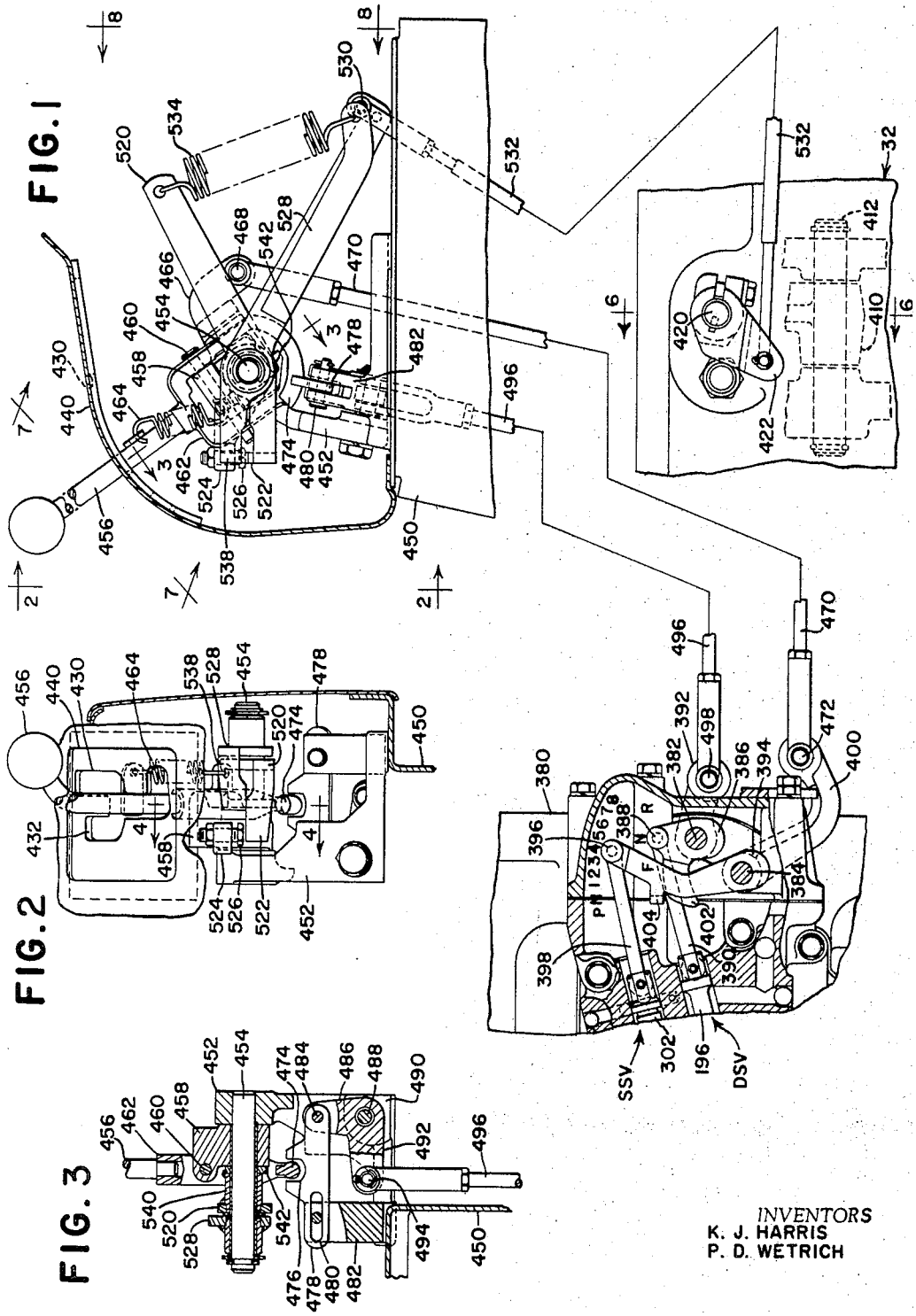

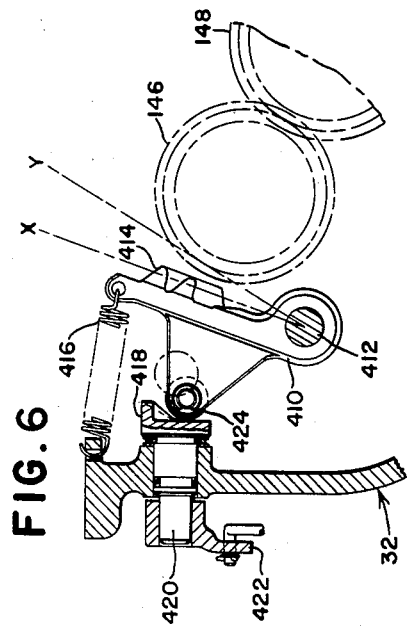
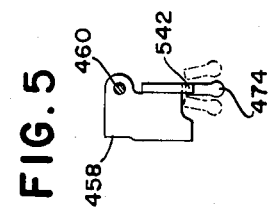
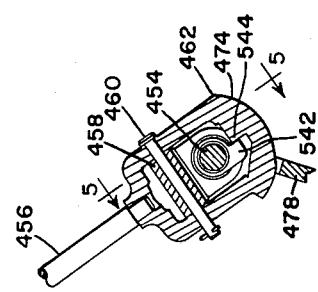
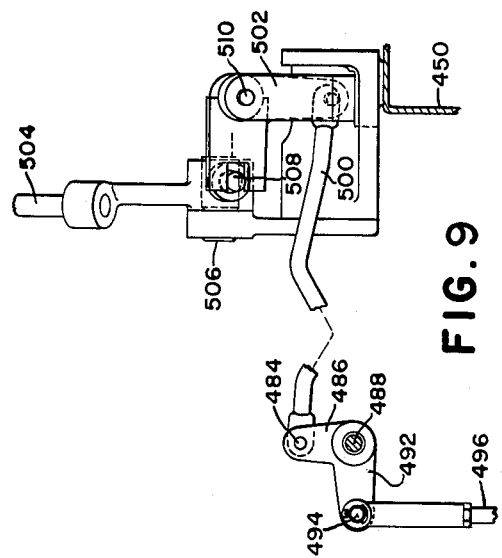
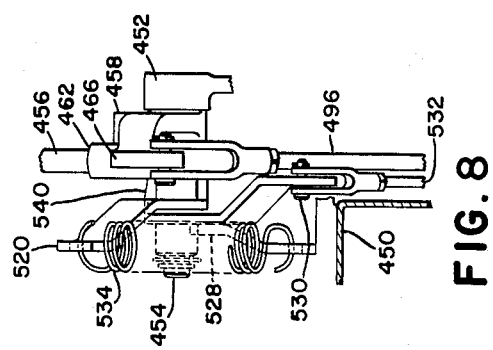
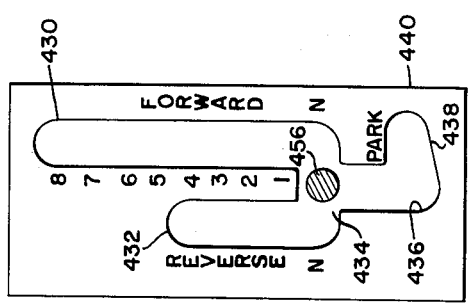
INVENTORS
K. J. HARRIS
P. D. WETRICH 3,242,758
CONTROL MECHANISM
Kenneth J. Harris and Peter D. Wetrich, Waterloo, Iowa, assignors to Deere & Company, Moline, Ill., a corporation of Delaware
Filed Jan. 17, 1964, Ser. No. 338,376
17 Claims. (Cl. 74—476)

As applied to a transmission having 8 forward speeds and 4 reverse speeds, it is an object of the invention to provide simple shifting means, together with a shift pattern incorporating a simple fore-and-aft lever movement with a short crossover between the two paths for forward and reverse speeds. Combined with this is the feature that a clutch pedal as such is not necessary for normal operation but is available for inching and emergency stops.

The invention further features control mechanism especially applicable to hydraulic control, thereby contributing to the smooth and rapid shiftability of the transmission. Where pilot valves are used in connection with a main control valve, a single shift lever may be employed; although, two levers may be provided in industrial tractors, one for forward speeds and the other for changing rapidly between forward and reverse. This phase of the invention features safety interlock means among the linkage and valves so that accidental shifting into undesired speed conditions is prevented. The control linkage also incorporates the control of a parking lock for the tractor, together with means for assuring certain conditions of the parking lock according to changes in position of the single shift control lever.

The foregoing and other important objects and desirable features inherent in and encompassed by the invention will become apparent as a preferred embodiment thereof is disclosed in detail, by way of example, in the ensuing description and accompanying sheets of drawings, the several figures of which will be described below.

FIG. 1 is a longitudinal composite sectional view of the shifter controls and the elements immediately controlled thereby.

FIGURE 2 is a rear view of FIG. 1 as seen on the line 2—2.

FIG. 3 is a section on the line 3—3 of FIG. 1.

FIG. 4 is a section on the line 4—4 of FIG. 2.

FIG. 5 is a section, partly schematic, on the line 5—5 of FIG. 4.

FIG. 6 is a section on the line 6—6 of FIG. 1.

FIG. 7 is a plan of the shift pattern as seen on the line 7—7 of FIG. 1.

FIG. 8 is a fragmentary front view as seen on the line 8—8 of FIG. 1.

FIG. 9 is a front elevation showing a modified form of control.

As will be seen clearly in FIG. 1, a basic support or housing, identified by the numeral 380, has a forward portion which carries a pair of transverse pivot shafts 382 and 384, the axes of which are parallel but which are transverse to the generally fore-and-aft axes or lines of movement of upper and lower valve members 302 and 196. The shaft 382 has pinned or otherwise secured thereto an arm 386 which extends upwardly to a pivotal connection 388 to a valve rod 390 which in turn is connected to the spool or valve member 196 which, in a preferred embodiment is part of a direction selector valve DSV. The arm 386 is thus rockable among three positions; namely, a forward position and a reverse position at opposite sides of an intermediate or neutral position. These positions are identified in the figure by the letters F, N and R. In FIG. 1, the direction selector valve occupies its neutral status or position. The shaft 382 extends externally of the support or housing 380 and has affixed thereto an operating arm 392, which is controlled by means to be presently described.

The second rockshaft 384 has affixed thereto an upstanding arm 394 which has at its upper end a pivotal connection 396 to a valve rod 398 which is turn connected to the slidable valve member 302 for a speed selector valve SSV. The arm, and accordingly the speed selector valve, is movable among several positions. At one end of the range of movement is a park position, next is a neutral position and next is a speed range of sequentially increasing speeds. In the drawing, an arcuate row of letters and numerals indicates these at P–N–1–2–3–4–5–6–7–8. As shown, the arm 394, and consequently the speed selector valve, is in its fourth speed position. The rockshaft 384 is connected externally of the support or housing 380 to an operating arm 400, which, like the arm 392, is controlled by control mechanism to be subsequently described.

The direction selector valve arm 386 has a rearwardly extending nose or portion 402, the fore-and-aft upper arcuate edge of which is an arc about the axis of the other rockshaft 384. The speed selector valve arm 394 has a rearwardly and laterally inwardly directed lug or portion 404, which lies just above the arcuate edge on the nose 402. In the positions of the parts as shown in FIG. 1, the disposition of the lug 404 on the speed selector valve arm is such that the direction selector valve arm may be readily moved among its F, N and R positions. Likewise, the relative dispositions of the nose and lug are such that the speed selector valve arm may be rocked among its ten positions. Now, in order to limit the use of reverse speeds, the nose and lug are so designed as to provide an interlock. In the present case, it is desired to prevent use of the transmission in reverse at speeds above fourth. Thus, it will be seen that if the speed selector valve arm 394 is moved to its fifth speed position, while the direction selector valve arm 386 is in neutral, the lug 404 will move one increment to the right and thus will lie directly above the arcuate upper edge on the nose 402. Consequently, the direction selector valve arm 386 cannot be rocked in a clockwise direction (to its reverse position); although it can freely be rocked between its forward and neutral positions. In short, when the speed selector valve arm 394 is in any position from fifth through eighth, the direction selector valve arm 386 cannot be rocked to reverse. This effectively prevents use of speeds higher than fourth in reverse. Other selections could be made but the basic point is that the interlock is established between the speed selector valve arm and direction selector valve arm.

A further characteristic of the interlock is this: If, with the speed selector valve arm 394 in fourth or below (except in park position), the direction selector valve arm 386 is moved to its reverse position, it will be seen that the spool 196 will move outwardly or forwardly. If the speed selector valve arm is now moved in a counterclockwise direction to its neutral position, the lug 404 will just about contact the front edge of the direction selector valve spool 196. Further counterclockwise movement of the speed selector valve arm to its park position will cause the lug 404 to contact the front edge of the spool 196 and will therefore force the spool back to its neutral position. This means that when the transmission is in its park condition it cannot simultaneously be in reverse. Likewise, as long as the speed selector valve arm 394 is in its park position, the direction selector valve spool cannot be moved out of its neutral position. This assures that the tractor operator will not inadvertently start the tractor in reverse as he shifts out of park position.

The interlock has a still further function. With the speed selector valve arm in any position from neutral to fourth, the direction selector valve arm can be moved to its reverse position. However, as it does so, the rear arcuate edge of the nose 402 moves upwardly and forwardly and in blocking relation to the inner forward edge of the lug 404. This means that the speed selector valve cannot now be moved to a position higher than fourth. Therefore, the interlock between the two arms is complete for the purposes intended.

On the basis of the brief description of what is involved, the two valve members 196 and 302 comprise lower and upper selectively shiftable members and the two arms 386 and 394 comprise operators having interlocking portion, such as 402 and 404, for blocking out certain phases of the coordinated movement of the two, in this specific example the two rockshafts 382 and 384 comprising upper and lower transverse pivots.

Of course, in the commercial embodiment of the transmission, the housing 380 and its related parts will be internally of the vehicle along with the transmission components.

In addition to the two elements—speed selector valve and direction selector valve—as constituting controllable parts of the transmission, there is a third element; namely, a parking lock, the basic structure of which is best shown in FIGS. 1 and 6. The lock in this case preferably comprises a parking lock member or pawl 410 pivotally mounted on a fore-and-aft axis by means of a shaft 412, which is suitably carried in any part of a transmission housing 32. The pawl has a toothed portion 414 normally biased by a spring 416 to a release or unlocked position relative to the output shaft gear 146. The dot-dash line X through the toothed portion 414, together with the other dot-dash line Y, represents the difference between the two positions, the line Y is of course showing the locked position in which the toothed portion 414 engages the teeth of the gear 146. In this case, the gear is of the helical type, which accounts for the shape of the toothed portion 414.

Movement of the pawl 410 from its release or unlocked position (position X) to its locked or park position (position Y) is effected by a cam 418 secured to a short transverse rockshaft 420 which extends externally of the housing 32, having affixed thereto an external operating arm 422. When the cam occupies the position shown in FIGS. 1 and 6, a follower 424 on the pawl 410 occupies a low portion on the cam. When the cam is turned in a counterclockwise direction, the high portion of the cam, engaging the follower 424, forces the pawl to position Y—its locked or parked position. When the arm 422 and rockshaft 420 are then turned oppositely, the spring 416 will retract the pawl 410.

It is a feature of the invention that the three controllable transmission elements, namely, the speed selector valve SSV, the direction selector valve DSV and the parking lock or pawl 410, be controlled by, in one form of the invention, a single control lever movable in a convenient shift pattern, with provisions made for modification of the control by the addition thereto of a second lever for controlling the direction selector valve in the cases of certain types of tractors. The single-lever control will be described first, in connection with a shift pattern best shown in FIG. 7.

As seen in that figure, the shift pattern is primarily J-shaped, the upper portion thereof being in the form of a J and further having a lower or tail portion of smaller L-shaped configuration. The basic part of the J has an elongated fore-and-aft slot or guide 430, a shorter slot or guide 432 and a transverse bottom or bight portion 434, from an intermediate portion of which the tail part of the slot depends, this tail part having a short fore-and-aft leg 436 and a transverse lower part 438. This configuration is formed in a sheet of steel or other suitable metal such as designated generally by the numeral 440, the whole forming part of or overlying supporting structure on which the control mechanism is mounted, to be described below. Having reference still to FIG. 7, it will be noted therein that the figure bears the identification of the several positions of the shift lever, as indicated by the numerals 1–8, as well as by the legend "forward" along the long slot 430 and "reverse" along the short slot 432. In addition, the letter "N" is used twice, once at the bottom of each of the reverse and forward ranges, as well as the legend "park" at the short or offset portion 438 of the trial part of the slot. In the commercial embodiment, this portion of the panel will of course be readily visible to the operator, the panel occupying the typical position of an instrument panel or console on the vehicle; that is, just ahead of the steering wheel and within ready access to the operator.

The console or other supporting part of the tractor, of which the panel 440 forms a part, is designated generally by the numeral 450, and includes a bracket or equivalent support 452 which supports a fixed pivot shaft 454 to establish a transverse pivot axis for the mounting of a control lever unit comprising a lever 456 and a lever-mounting member 458. The arrangement is such that the lever 456 projects outwardly through and is guided by the pattern (FIG. 7), the lever being in this case somewhat in the nature of a radius as respects the transverse axis of the pivot shaft 454. The mounting member 458 is generally in the nature of a block loose on the shaft 454 and therefore freely rockable about the axis of the shaft. The connection between the lever 456 and the block 458 is established by a pin 460 which lies in a longitudinal or fore-and-aft plane; at least, a plane that intersects the axis of the shaft 454 at a right angle. For present purposes, the axis of the pivot pin 460 may be considered fore-and-aft, even though it inclines somewhat upwardly and forwardly, depending upon the position of the lever 456 relative to the front and rear limits established by the shift pattern. The lower end of the lever has a box-like portion 462 which closely embraces the mounting block 458 (FIG. 4). Because of this configuration, the lever and block are interconnected for fore-and-aft rocking of the block about the shaft 452; yet, the lever itself is rockable laterally about the pivot pin 460. This will best be appreciated by consideration thereof in conjunction with the shift pattern of FIG. 7. The lever 456 there is shown in its central or neutral position, as is true also of FIGS. 2, 3 and 4. This lever may be shifted laterally to either of two positions, to the left to its reverse position or to the right to its forward position. When, for example, it is shifted to its forward position, it is then in a speed position for attaining the eight forward speeds. When shifted to the left, to the reverse speed position, it is capable of being shifted through four reverse speeds, the upper end of the slot 432 establishing a limit on the shiftability of the lever. This is in addition to the interlock established between the speed selector valve and direction selector valve in the valve housing 380, described above.

From its central position, the lever 456 may be shifted downwardly into the fore-and-aft portion of the tail slot, which places the speed selector valve in its park position, as well as conditioning the park pawl 410 for engagement with the output gear 146. Because of the pivot pin 460, the lever 456 may be shifted laterally to the right, into the transverse portion of the tail slot, thereby retaining the park position. For this purpose, the block 458 and lever 456 are interconnected by a small tension spring 464 which biases the lever to the right. Bearing in mind the arrangement of the valve control mechanism in the lower left-hand portion of FIG. 1, it will be seen that leftward shifting of the lever 456 in the portion 438 of the tail part of the slot leaves the transmission in park, and it requires a further forward shifting thereof to the position of FIG. 7 before the park lock is released. As previously described, this assures that the transmission is in neutral, so that it cannot be inadvertently started in reverse. From the central position of FIG. 7, the operator may select either the forward range or the reverse range. As already noted, the operator has available to him eight forward speeds but only four reverse speeds, since, as already explained, these particular speeds have proven sufficient for vehicles of this type.

Integral with the mounting member or block 458 is a forwardly and downwardly curved arm 466 which is connected by a pivot pin 468 to a link 470 which extends downwardly and rearwardly and which is connected by a pivot pin 472 to the previously described speed selector valve arm 400. Hence, rocking of the mounting member or block 458 about the axis of the shaft 454 will effect shifting of the speed selector valve SSV among its several positions, including neutral through eight when in the forward range, neutral through fourth when in the reverse range and between neutral and park when in its center position.

The lower part of the box-like portion 462 of the lever 456 is in the form of an arc or track 474 which runs in a notch or slot 476 in a laterally shiftable member 478. As best seen in FIG. 3, one end of the member 478 is carried by a pin and slot connection 480 on a portion 482 of the bracket 452, and is pivotally connected at its other end by a pivot pin 484 to one arm 486 of a bell crank that is pivoted at 488 on another portion 490 of the bracket 452. The other arm 492 of the bell crank is connected by a pivot pin 492 to the upper end of a link 496, the lower end of which is connected by a pivot pin 498 to the previously described direction selector valve arm 392.

It will thus be seen that rocking of the lever 456 about the pivot 460, when the lever is in the cross portion 434 of the shift pattern (FIG. 7) will shift the member 478 among its forward, neutral and reverse positions, thereby rocking the bell crank 486–492 to effect changes in position of the direction selector valve DSV. It will be clear of course that lateral rocking of the lever 456 has no effect on the angular position of the mounting block 458. Hence, the position of the speed selector valve is not changed. Conversely, so long as the lever 456 is in one or the other of the fore-and-aft tracks 430 or 432, it cannot be rocked laterally and therefore as the speed selector valve is moved among its several positions (first through eighth) the position of the direction selector valve cannot change. In short, it is only when the lever 456 is in the cross portion of the "J" that selection may be made among forward, reverse or park.

FIGURE 9 shows a modified form of arrangement in which the bell crank 486–492, instead of being connected directly to the lever 456, is connected by a link 500 to a bell crank 502 of a different form of lever construction, that shown comprising a second lever 504 mounted independently of the lever 456 and rockable about a cross shaft 506 so as to transfer movement via a lever-carried pin 508 to a slotted arm of the bell crank. The bell crank is pivoted at 510 on other portions of the support 450. In a tractor having controls of this type, the "J" pattern is replaced by a single slot corresponding to the long leg 430 of the pattern of FIG. 7, plus the L-shaped portion affording a park position. Controls of this type will be used on tractors of the so-called industrial type, wherein a forward speed is selected and then a second lever is used to "shuttle" back and forth between forward and reverse while the speed selector valve is in the same position. In that case, as in the agricultural tractor, the interlock will be present (lower left-hand portion of FIG. 1) so that only the four speeds may be used in reverse. This interlock will also require that the lever 504 be returned to neutral or forward before speeds higher than fourth can be obtained in a forward direction.

The park lock is controlled by the lever 456 through the medium of intervening arms and levers to be described at this time. Loose on the transverse shaft 454 is an arm 520 which has a portion to the rear of the shaft 454 bent inwardly or laterally to afford an abutment 522. A rearwardly extending arm 524, integral with the mounting block 458, carries an adjustable abutment screw 526 which is engageable at times with the abutment 522 on the park lock arm 520. Looking now at FIGS. 1 and 2, it will be seen that the lever 456, occupying its neutral position, conditions the abutment 526 to a point just short of engagement with the arm abutment 522. Consequently, rearward movement of the lever 456 (FIG. 1) rocks the mounting block 458 so that the abutment screw 526 contacts the arm abutment 522, thereby rocking the arm 520 in a counterclockwise direction. This occurs of course as the lever is moved from its neutral to its park position. Since the relationship between the abutments 522 and 526 is effective in only one direction (counterclockwise) it follows that forward movement of the lever 456 among the several speed positions has no positive effect on the park arm 520. Hence, this connection is a one-way lost-motion connection.

Also loose on the pivot shaft 454 is a second park lock arm 528, the free end of which is connected at 530 to a link 532 which in turn is connected to the park lock outer arm 422 (FIG. 1). A force-transmitting connection is established between the two park arms 520 and 528 by a yieldable means, here in the form of a tension spring 534. In the positions of the parts as shown in FIGS. 1 and 6, the park pawl spring 416 has sufficient force to keep the park pawl in its released position (position X), and whatever force is transmitted by the spring 534 is not sufficient to change this condition. However, when the control lever 456 is rocked rearwardly to its park position, causing engagement at the abutment means 526–522, a counterclockwise motion is imparted to the upper park arm 520. This tensions the spring 534 and exerts on the arm 528 a force sufficient to overcome the force exerted by the park pawl spring 416. If the alinement of the teeth on the output shaft gear 146 relative to the toothed portion 414 of the park pawl is such that the teeth will not mesh, the park pawl of course stops short of mesh, but the force exerted by the spring 534, acting through the linkage 532, loads the park pawl so that upon slight turning of the output shaft gear 146, the locking condition is achieved and the force just described is sufficient to maintain this parked condition.

When the lever 456 is moved forwardly from its park position to its neutral position, the one-way connection (abutment means 522–526) cannot return the arm 520 downwardly and, consequently the arm 528 cannot return the other arm 528. Thus, the spring 416, acting on the park pawl 410, would be ineffective to return the park pawl to its released position when binding between the teeth on the gear 146 and those on the park pawl is excessive. Therefore, it is desired to transmit a positive releasing force to the park pawl rockshaft 420. This is accomplished by providing the arm 528 with a rear lug 538 which overlies the lug 522 on the arm 520 (FIGS. 1 and 2).

As best seen in FIG. 3, the park arm 520 is rigidly secured to a sleeve 540 which in turn has rigidly secured thereto at its inner end a depending lug 542 (see also FIG. 4). The interior of the box-like portion 462 at the lower end of the lever 456 is provided with a one-way lug 544 (FIG. 4) which is engageable with the park arm lug 542 when the lever 456 is in its central position. In this case, this occurs only when the lever 456 is alined with the fore-and-aft portion 436 of the L-shaped or tail slot in the shift pattern (FIG. 7). Further, the lugs 542 and 544 are operatively engageable only when the lever 456 is moved forwardly from "park" to neutral; that is, the neutral position at the center of the transverse slot portion 434 of the J. Whenever the lever 456 is rocked to either side, the lug 544 becomes misalined with the lug 542 (broken lines in FIG. 5, which show the respective positions of the track 474 when the lever 456 is traveling in either one of the slots 430 (forward) or 432 (reverse)). Consequently, since the lugs 542 and 544 become disengaged in this condition, fore-and-aft rocking of the lever 456 in either of the forward or reverse speed ranges does not require a concomitant rocking of the park arm 520. Nevertheless, when the two lugs are engaged, as when the lever 456 is moving from its park to its neutral position, it establishes a one-way force-transmitting connection operative to exert a clockwise force on the arm 520 which in turn acts through the now engaged lugs 522 and 538 to rock the other arm 528 also clockwise, exerting a downward force on the park lock link 532.

In summary of the control mechanism, it should be observed that there are three controllable transmission parts; namely, the speed selector valve SSV, the direction selector valve DSV, and the park lock pawl 410. The two valves are independently controlled, with appropriate interlocks provided, not only in the housing 380, but also in the shift pattern (FIG. 7) to assure that the valves are moved independently of each other although in a related manner. The park lock is controlled in such manner that it cannot be engaged while the transmission is in a speed condition, nor can the transmission be placed in a speed condition until the control lever is first moved to take the transmission out of its parked condition.

Features of the invention in its entirety, other than those categorically enumerated, will readily occur to those versed in the art, as will many modifications and alterations in the preferred embodiment disclosed, all of which may be achieved without departure from the spirit and scope of the invention.

What is claimed is:

1. Control mechanism, comprising: a fore-and-aft support; a rockable member carried by the support for fore-and-aft rocking about a transverse axis; a lever projecting substantially upwardly from said member generally as a radius from said axis and including an operating portion depending below said axis; means mounting the lever on the member for movement of the two in unison about said transverse axis and including a generally fore-and-aft axis about which the lever is rockable laterally relative to the member between first and second positions; a first controllable element operably connected to and movable through a predetermined control range exclusively by fore-and-aft rocking of said member; an operating member carried by the support below said transverse axis and for lateral shifting between first and second positions and including a slot receiving said depending lever portion for effecting said lateral shifting by lateral rocking of the lever and for enabling fore-and-aft rocking of the lever with the rockable member; a second controllable element operably connected to and movable by said operating member; means for regulating movement of the first element by rocking of the lever and member about said first axis and operative, when the lever is in its first position, to enable full-range movement of said first element and operative, when the lever is in its second position, to restrict movement of said first element to only an initial portion of said range; and means for regulating movement of the lever and operative to prevent movement of the lever from its second position back to its first position except when the first element is within said initial portion of said range.

2. The invention defined in claim 1, in which: said second element is connected to the operating member by a bell crank rockable on the support and having one arm connected to said operating member and a link connected between the other arm of the bell crank and said second element.

3. The invention defined in claim 1, in which: said two regulating means comprises a control pattern structure overlying the support and rockable member and having a generally J-shaped slot therein through which the lever projects, said slot having a transverse portion guiding said lever in its lateral rocking between its first and second positions, a relatively long fore-and-aft leg portion guiding said lever during fore-and-aft rocking thereof while in its first position to achieve full-range movement of the first element, and a relatively short fore-and-aft leg portion guiding and restricting fore-and-aft rocking of said lever while in its second position to achieve movement of said first member in its initial range portion, the part of said structure intervening between said fore-and-aft leg portions serving as means operative to prevent lateral shifting of the lever unless returned to said transverse slot portion.

4. The invention defined in claim 3, in which: said slot further includes a lever-receivable tail slot extending from the transverse slot portion in the direction opposite to the leg portions of the slot for receiving the lever when the lever, traveling in said transverse slot portion, is rocked about said fore-and-aft axis in the direction opposite to the direction of entry of said lever into either of said leg portions of the slot, and said mechanism includes a third controllable element operably connected to said lever and movable between first and second positions by movement of said lever respectively into and out of said tail slot portion.

5. The invention defined in claim 4, in which: said tail slot portion is L-shaped, having a first part extending from the transverse slot portion as aforesaid and a second lateral part into which the lever is movable transversely after being rocked into said first part whereby to releasably retain said first position of said third element.

6. Control mechanism, comprising: a support; a rockable member carried by the support for rocking about a transverse first axis; a control lever projecting from the member generally as a radius from said first axis and connected to said member for movement of the two in unison about said first axis and for lateral rocking of the lever relative to the member between first and second positions; a first controllable element operably connected to and movable through a predetermined control range exclusively by rocking of said member; a second controllable element operably connected to and movable exclusively by lateral rocking of said lever between said first and second positions; means for regulating movement of the first element by rocking of the lever and member about said first axis and operative, when the lever is in its first position, to enable full-range movement of said first element and operative, when the lever is in its second position, to restrict movement of said first element to only an initial portion of said range; and means for regulating movement of the lever and operative to prevent movement of the lever from its second position back to its first position except when the first element is within said initial portion of said range; said two regulating means comprising a control pattern structure overlying the support and rockable member and having a generally J-shaped slot therein through which the lever projects, said slot having a transverse portion guiding said lever in its lateral rocking between its first and second positions, a relatively long fore-and-aft leg portion guiding said lever during fore-and-aft rocking thereof while in its first position to achieve full-range movement of the first element, and a relatively short fore-and-aft leg portion guiding and restricting fore-and-aft rocking of said lever while in its second position to achieve movement of said first member in its initial range portion, the part of said structure intervening between said fore-and-aft leg portions serving as means operative to prevent lateral shifting of the lever unless returned to said transverse slot portion; said slot further including a lever-receivable tail slot extending from the transverse slot portion in the direction opposite to the leg portions of the slot for receiving the lever when the lever, traveling in said transverse slot portion, is rocked about said fore-and-aft axis in the direction opposite to the direction of entry of said lever into either of said leg portions of the slot, and said mechanism including a third controllable element operated exclusively by said lever and movable between first and second positions by movement of said lever respectively into and out of said tail slot portion.

7. The invention defined in claim 6, in which: said tail slot portion is L-shaped, having a first part extending from the transverse slot portion as aforesaid and a second lateral part into which the lever is movable transversely after being rocked into said first part whereby to releasably retain said first position of said third element.

8. The invention defined in claim 7, in which: the first part of said tail slot portion lies substantially midway between said leg slot portions and the lever when received in said tail slot portion achieves for the second element a mid-position between its first and second positions, and the second part of said tail slot portion extends laterally from said first part toward the relatively long leg slot.

9. Control mechanism for a multi-speed forward-reverse transmission, comprising: a housing having upper and lower parallel bores opening at one end thereof; a speed selector slidably carried in the upper bore for movement outwardly at said one end of the housing from a neutral position through a range of increasing speed positions and vice versa; a direction selector slidable in the lower bore and movable outwardly at said end successively through forward, neutral and reverse positions and vice versa; upper and lower pivot shafts carried by said housing at said end and transverse to said bores; a first arm rockable on the axis of the upper shaft and extending upwardly therefrom and connected to the direction selector; a second arm disposed generally alongside said first arm and rockable on the axis of the lower shaft and extending upwardly therefrom and connected to the speed selector; and cooperative elements respectively on said arms for preventing movement of the direction selector other than between its forward and neutral positions except when the speed selector is in either its neutral position or a relatively low-speed portion of its range and for preventing movement of the speed selector other than between its neutral position and through said low-speed range portion when said direction selector is in its reverse position.

10. The invention defined in claim 9, in which: said speed selector is further movable to a park position inwardly of its neutral position and said second arm includes means thereon operative to move the direction selector inwardly and out of its reverse position when said speed selector is moved to said park position.

11. The invention defined in claim 9, in which: said cooperative elements include a first element on the first arm and having an upper edge formed as an arc about the axis of the lower shaft and extending lengthwise as respects the speed selector for a distance equivalent to a high-speed portion of the speed selector range outwardly of said relatively low-speed position, and a second element on said second arm adapted to overlie and to swing back and forth in obstructing relation to said edge during swinging of said second arm while moving said speed selector in said highspeed portion of its range.

12. Control mechanism for a transmission, comprising: a fore-and-aft support; a control unit carried by the support for forward movement from a park position to a neutral position, thence laterally to a speed position and thence forwardly through a speed range and vice versa; a parking lock movable between engaged and disengaged conditions relative to a rotatable part of the transmission and biased to disengaged condition; a first arm rockable on the support on a transverse axis and operably connected to the parking lock; a second arm rockable on said axis relative to the first arm; first one-way lost-motion means operative by the control unit upon movement thereof from neutral position to park position to rock the second arm; yielding means connected between the arms and stressed by said rocking of the second arm to rock the first arm and thereby to act to move the parking lock to engaged condition; and second one-way lost-motion means operative by the control unit upon movement thereof from park position to neutral position to cause reverse rocking of the second arm, said second means being disengageable between the control unit and second arm upon movement of said unit laterally from said neutral position to said speed position.

13. Control mechanism for a transmission, comprising: a support; a control unit carried by the support for zig-zag movement in a first direction from a park position, thence crosswise to a speed condition, thence in said first direction through a speed range and vice versa; a parking lock movable between engaged and disengaged conditions relative to a rotatable part of the transmission and biased to disengaged condition; a first member movable on the support and operably connected to the parking lock; a second member movable on the support relative to said first member; first one-way lost-motion means operative by the control unit upon movement thereof from neutral position to park position to move the second member; yielding means connected between the members and stressed by said movement of the second member to move the first member and thereby to act to move the parking lock to engaged condition; and second one-way lost-motion means operative by the control unit upon movement thereof from park position to neutral position to cause reverse movement of the second member, said second means being disengageable between the control unit and second member upon movement of said unit laterally from said neutral position to said speed position.

14. Control mechanism for a transmission, comprising: a fore-and-aft support; including a transverse pivot; a control unit including a member rockable on said pivot and a lever rockable on said member on a fore-and-aft axis; shift pattern means guiding said unit for movement of said lever forwardly from a park position to a neutral position, thence laterally to a speed position and thence forwardly through a speed range and vice versa; a parking lock movable between engaged and disengaged conditions relative to a rotatable part of the transmission and biased to disengaged condition; a first arm rockable on the support on the afore-axis relative to said unit and operably connected to the parking lock; a second arm rockable on said axis relative to the first arm; first one-way lost-motion means operative by the control unit upon movement thereof from neutral position to park position to rock the second arm; yielding means connected between the arms and stressed by said rocking of the second arm to rock the first arm and thereby to act to move the parking lock to engaged condition; and second one-way lost-motion means operative by the control unit upon movement thereof from park position to neutral position to cause reverse rocking of the second arm, said second means being disengageable between the control unit and second arm upon movement of said unit laterally from said neutral position to said speed position.

15. Control mechanism for a transmission, comprising: a fore-and-aft support; a control unit carried by the support for forward movement from a park position to a neutral position, thence selectively laterally to either side of said neutral position to either of two speed conditions and thence forwardly from either speed position through an associated speed range and vice versa; a parking lock movable between engaged and disengaged conditions relative to a rotatable part of the transmission and biased to disengaged condition; a first arm rockable on the support on a transverse axis and operably connected to the parking lock; a second arm rockable on said axis relative to the first arm; first one-way lost-motion means operative by the control unit upon movement thereof from neutral position to park position to rock the second arm; yielding means connected between the arms and stressed by said rocking of the second arm to rock the first arm and thereby to act to move the parking lock to engaged condition; and second one-way lost-motion means operative by the control unit upon movement thereof from park position to neutral position to cause reverse rocking of the second arm, said second means being disengageable between the control unit and second arm upon movement of said unit laterally from said neutral position to either of said speed positions.

16. Control mechanism for a transmission comprising: a control unit carried by the support for movement in a zig-zag pattern in a first direction from a park position to a neutral position, thence crosswise of said first direction to a speed position and thence in said first direction through a speed range and vice versa; a parking lock movable between engaged and disengaged conditions relative to a transmission part; first one-way lost-motion means operative by the control unit upon movement thereof from neutral position to park position to influence the parking lock to its engaged condition; and second one-way lost-motion means operative by the control unit upon movement thereof from park position to neutral position to move the parking lock to its disengaged condition, said second means being disengageable between the control unit and parking lock upon movement of said unit laterally from said neutral position to said speed position.

17. Control mechanism for a multi-ratio forward-reverse transmission, comprising: a support; a speed selector carried by the support for movement in one direction from a neutral position through a range of sequentially increasing speed positions and vice versa; a direction selector carried by the support for movement between forward and reverse positions at opposite sides of a neutral position; means operative by the speed selector and on the direction selector for enabling forward-neutral-reverse movement of said direction selector, and vice versa while said speed selector is in either its neutral position or a low-speed portion of its range and for limiting movement of said direction selector to forward-neutral and vice versa while said speed selector is in a high-speed portion of its range; means operative by the direction selector for enabling full-range movement of the speed selector while said direction selector is in its neutral position and for limiting movement of said speed selector to its low-speed range portion while said direction selector is in its reverse position; said speed selector being additionally movable to a park position at the side of its neutral position opposite to its speed range; and means operative by said speed selector upon movement thereof to said park position for forcing the direction selector to move out of its reverse position.

References Cited by the Examiner

UNITED STATES PATENTS

| | | | |
|---|---|---|---|
| 2,890,603 | 6/1959 | Harris et al. | 74—760 X |
| 2,917,941 | 12/1959 | Wittren | 74—473 |
| 2,964,135 | 12/1960 | Sand | 188—69 |
| 3,184,989 | 5/1965 | Rhodes | 74—533 X |

MILTON KAUFMAN, *Primary Examiner.*